United States Patent
Schzukin

(10) Patent No.: US 6,643,265 B1
(45) Date of Patent: Nov. 4, 2003

(54) APPARATUS FOR AND METHOD OF RELEASING STUCK VIRTUAL CIRCUITS IN AN ASYNCHRONOUS TRANSFER MODE NETWORK

(75) Inventor: Golan Schzukin, Tel Aviv (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/569,606

(22) Filed: May 10, 2000

(51) Int. Cl.[7] .............................................. H04L 12/56
(52) U.S. Cl. ...................................... 370/242; 370/248
(58) Field of Search ................................. 370/473, 241, 370/244, 395.1, 395.6, 242, 248, 474

(56) References Cited

U.S. PATENT DOCUMENTS

| | | | | |
|---|---|---|---|---|
| 5,633,867 A | * | 5/1997 | Ben-Nun et al. | 370/399 |
| 5,668,812 A | * | 9/1997 | Akiyoshi | 370/474 |
| 5,689,501 A | * | 11/1997 | Takase et al. | 370/244 |
| 6,249,528 B1 | * | 6/2001 | Kothary | 370/466 |

OTHER PUBLICATIONS

ATM Manual, Logtel Computer Communications, Ltd., Undated, pp. 115–126, 156–157.

* cited by examiner

Primary Examiner—Chau Nguyen
Assistant Examiner—Christine Ng
(74) Attorney, Agent, or Firm—Howard Zaretsky

(57) ABSTRACT

An apparatus for and a method of locating and releasing stuck virtual circuits in an ATM network device. Memory resources are freed that would otherwise be lost due to the last cell of a frame not being received on a particular virtual circuit. Two flags: a sticky first_cell flag and a last_cell flag, track the status of the receipt of a frame over a virtual circuit. The software periodically examines the two flags and if both the first_cell flag and last_cell flags are found cleared then a 'stuck' virtual circuit is identified indicating that the hardware did not detect a first cell of a frame on this particular virtual circuit since the last time the software cleared this bit to '0'. In response to the identification of a stuck virtual circuit, the software releases the memory resources consumed by the incomplete frame.

25 Claims, 4 Drawing Sheets

APPARATUS FOR AND METHOD OF RELEASING STUCK VIRTUAL CIRCUITS IN AN ASYNCHRONOUS TRANSFER MODE NETWORK

FIELD OF THE INVENTION

The present invention relates generally to data communications networks and more particularly relates to a method of releasing stuck virtual circuits in an asynchronous transfer mode network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM is a connection oriented transport service. To access the ATM network, a station requests a virtual circuit between itself and other end stations, using the signaling protocol to the ATM switch. ATM provides the User Network Interface (UNI) that is typically used to interconnect an ATM user with an ATM switch that is managed as part of the same network.

The current standard solution for routing in a private ATM network is described in Private Network Node Interface (PNNI) Phase 0 and Phase 1 specifications published by the ATM Forum. The previous Phase 0 draft specification is referred to as Interim Inter-Switch Signaling Protocol (IISP). The goal of the PNNI specifications is to provide customers of ATM network equipment some level of multi-vendor interoperability.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

A diagram illustrating the format of an ATM cell including the cell header format across the UNI is shown in FIG. 1. The header comprises an 8-bit Virtual Path Indicator (VPI) and a 16-bit Virtual Circuit Indicator (VCI). A four-bit Generic Flow Control (GFC) field supports multiplexing functions. The GFC mechanism is intended to support simple flow control in ATM connections. The Cell Loss Priority (CLP) one-bit field corresponds to the loss priority of a cell. In operation, lower priority cells (i.e. CLP=1) can be discarded under congestion situations. The Header Error Check (HEC) is an 8-bit field that is used for header error detection and correction. The importance of the information in the header requires use of the HEC. The payload follows the HEC field in the ATM cell header and comprises 48 bytes.

The Payload Identifier Type (PTI) is a 3-bit cell header field for encoding information regarding ATM Adaptation Layer (AAL) and Explicit Forward Congestion Indication (EFCI). The AAL is a collection of standardized protocols that adapts user traffic to a cell format. AAL5 is the protocol standard used to support the transport of Variable Bit Rate (VBR) traffic and signaling messages. EFCI is a one-bit field containing information whether congestion at an intermediate node has been experienced. The EFCI bit is set when a threshold has been exceeded.

ATM Adaptation Layer

In the AAL5 protocol, every AAL frame to be transmitted over the ATM network is segmented into cells. The last cell of the frame is indicated in the ATM cell header in the PTI field of the cell header. In particular, the last cell is indicated by the third bit in the PTI field being cleared, the second bit a don't care and the first bit being set, i.e. PTI=1 or 3. An ATM network device that receives AAL5 frames must reassemble all the cells received over each Virtual Circuit (VC), i.e. VPI/VCI pair, until the last cell of the frame is received. After the last cell of the cell is received, the entire frame is available and can be sent to its corresponding destination port, i.e. Ethernet port, host, etc.

A problem occurs, however, in the event the last cell of the frame on a specific VC gets lost and no subsequent 'last cell' is received (even from the next frame) on the VC. In the event the last cell is not received, the previously received cells of the frame remain stored in the network device and consume memory resources that are never released since a last cell indication will never be received on the specific VC. The problem is compounded in an ATM network device that establishes a large number of VCs (i.e. several thousand) wherein the last cell is lost for a large percentage of the VCs. In this case, a majority of the memory resources may be consumed and not available for other VCs.

For example, a network device such as an ATM switch or edge device that is connected to the ATM network may be accidentally disconnected. All virtual circuit connections that were already established and that were in the midst of receiving frames, will never be completed and closed. The frames waiting to complete consume memory resources and depending on the number of incomplete frames, the amount of memory may be large.

Consider an ATM edge device adapted to transport 10 Mbps Ethernet over the ATM network. Assume each Ethernet frame comprises 1518 bytes, thus occupying 32 ATM cells to send the corresponding AAL5 frame. Assuming one thousand open connections at the time the device is disconnected from the network, this translates to approximately 1.5 Mbytes of memory. Depending on the size of the memory in the device, this may amount to a sizeable portion of the memory. Note that even a relatively small portion of memory, e.g., 5 or 10%, creates a problem since the memory consumption is cumulative if it is not released.

In some cases, the hardware in the device will timeout and cause the software to clear the call, but the memory consumed by the incomplete frame remains. In other cases, both the virtual circuit connection remains and the memory is not cleared.

It is therefore desirable to have a mechanism adapted to locate virtual circuits that are stuck due to lost 'last cells' and to release these 'stuck' virtual circuits thus freeing up memory resources that could be used for new virtual circuits.

SUMMARY OF THE INVENTION

The present invention solves the problems associated with the prior art by providing an apparatus for and a method of locating and releasing stuck virtual circuits in an ATM network device. The invention functions to free memory resources that would otherwise be lost due to the last cell of a frame not being received on a particular virtual circuit. The memory savings made possible by the present invention increase as the number of virtual circuits increase wherein the last cell of the frame was not received.

Throughout this document the term stuck virtual circuit is meant to denote a virtual circuit wherein the last cell of a frame being transmitted over that virtual circuit is never received. This may be caused for any reason such as an ATM network device losing its ATM connection due to a disconnection, loss of power, mechanical fault, etc.

The invention utilizes two flags: a first_cell flag and a last_cell flag, to track the status of the receipt of a frame over a virtual circuit. The hardware sets the last_cell bit to '1' for a specific virtual circuit when a cell with an end of frame indication is received on that virtual circuit. The hardware clears the last_cell bit to '0' for a specific virtual circuit when a cell is received without an end of frame indication on that virtual circuit. The hardware sets the first_cell bit to '1' for a specific virtual circuit when the first cell of a frame is received on that virtual circuit. Otherwise the hardware does not modify the first cell_bit. The first_cell bit operates as a 'sticky' bit as the hardware can only set the bit and cannot clear it. The bit can only be cleared by software.

The software periodically examines the two flags and if both the first_cell flag and last_cell flags are found cleared then a 'stuck' virtual circuit is identified. This means that the hardware did not detect a first cell of a frame on this particular virtual circuit since the last time the software cleared this bit to '0'.

Once a stuck virtual circuit is detected, the software generates a single cell adapted to have an end of frame indication. The cell is processed as if it was received over the ATM network on the problematic virtual circuit and will cause the frame to be closed on this particular virtual circuit, thus releasing the memory resources.

Alternatively, the software writes the VPI and VCI to a hardware register and in response, the hardware restores the state of the virtual circuit back to normal operating state. The hardware comprises the appropriate circuitry and logic to emulate the events that would occur if it had received a cell in error having an end of frame indication.

Preferably, the software scans the first_cell and last_cell bits on a periodic basis. Alternatively, the software may scan on an irregular basis such when the software performs regular housekeeping tasks.

There is thus provided in accordance with the present invention a method of releasing a stuck virtual circuit, wherein the last cell of a frame transmitted on the virtual circuit is not received, the method comprising the steps of setting a first_cell flag upon reception of the first cell of a frame on the virtual circuit, setting a last_cell flag upon reception of a cell on the virtual circuit having an end of frame indication, clearing the last_cell flag upon reception of a cell on the virtual circuit not having an end of frame indication, examining the first_cell flag and the last_cell flag periodically; and if the first_cell flag is set, clearing the first_cell flag, and if, after a predetermined period of time, the first_cell flag is cleared and the last_cell flag is cleared then identifying the virtual circuit as a stuck virtual circuit and releasing memory resources currently consumed by the stuck virtual circuit.

There is also provided in accordance with the present invention a method of releasing a stuck virtual circuit, wherein the last cell of a frame transmitted on the virtual circuit is not received, the method comprising the steps of setting a first_cell bit upon reception of the first cell of a frame on the virtual circuit, setting a last_cell bit upon reception of a cell on the virtual circuit having an end of frame indication, clearing the last_cell bit upon reception of a cell on the virtual circuit not having an end of frame indication, examining on a periodic basis the first_cell bit and the last_cell bit, and if the first_cell bit is set, clearing the first_cell bit, identifying the virtual circuit as a stuck virtual circuit when a first cell has not been received since the first_cell bit was cleared and the last_cell bit is cleared and releasing memory resources currently consumed by the stuck virtual circuit.

There is further provided in accordance with the present invention an apparatus for releasing a stuck virtual circuit, wherein the last cell of a frame transmitted on the virtual circuit is not received comprising a control memory adapted to store, for each virtual circuit, a first_cell bit and a last_cell bit, a cell processor operative to set a first_cell bit upon reception of the first cell of a frame on the virtual circuit, set a last_cell bit upon reception of a cell on the virtual circuit having an end of frame indication, clear the last_cell bit upon reception of a cell on the virtual circuit not having an end of frame indication, software means operative on the cell processor to examining the first_cell bit and the last_cell bit periodically, and if the first_cell bit is set, clearing the first_cell bit; and if, after a predetermined period of time, the first_cell bit is cleared and the last_cell bit is cleared then identifying the virtual circuit as a stuck virtual circuit and means for releasing memory resources currently consumed by the stuck virtual circuit.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
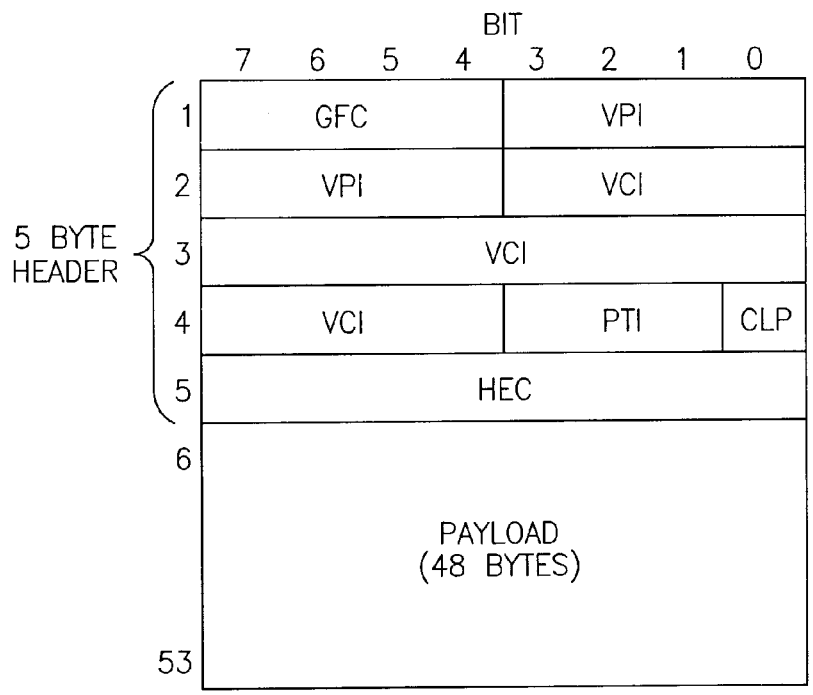
FIG. 1 is a diagram illustrating the format of an ATM cell including the cell header format across the UNI.

The following notation is used throughout this document.

| Term | Definition |
| --- | --- |
| AAL | ATM Adaptation Layer |
| ANSI | American National Standards Institute |
| ATM | Asynchronous Transfer Mode |
| BUS | Broadcast and Unknown Server |
| CAM | Content Addressable Memory |
| CCITT | Comite Consulatif International Telegraphique et Telephonique |
| CLP | Cell Loss Priority |
| CRC | Cyclic Redundancy Code |
| EFCI | Explicit Forward Congestion Indication |
| FDDI | Fiber Distributed Data Interface |
| GFC | Generic Flow Control |
| HEC | Header Error Check |
| IISP | Interim Inter-Switch Signaling Protocol |
| ITU | International Telecommunications Union |
| IVC | Incoming VPI/VCI table |
| LAN | Local Area Network |
| LANE | LAN Emulation |
| LEC | LAN Emulation Client |
| LECS | LAN Emulation Configuration Server |
| LES | LAN Emulation Server |
| OC | Optical Carrier |
| PDU | Protocol Data Unit |
| PNNI | Private Network to Network Interface |
| PTI | Payload Identifier Type |
| SMS | Selective Multicast Server |
| UDP | User Datagram Protocol |
| UNI | User to Network Interface |
| VC | Virtual Circuit |

Description of the Invention

The present invention solves the problems associated with the prior art by providing an apparatus for and a method of locating and releasing stuck virtual circuits in an ATM network device. The invention functions to free memory resources that would otherwise be lost due to the last cell of a frame not being received on a particular virtual circuit. The memory savings made possible by the present invention increase as the number of virtual circuits increase wherein the last cell of the frame was not received.

Throughout this document the term 'stuck virtual circuit' or 'stuck VC' denotes a virtual circuit wherein the last cell of a frame being transmitted over that virtual circuit is never received. This may be caused for any reason such as an ATM network device losing its ATM connection due to a disconnection, loss of power, mechanical fault, etc.

The present invention is useful for locating those virtual circuits that have frames waiting to complete. In operation, the invention is adapted to locate the stuck virtual circuits and perform some action in response thereto. For example, in one embodiment, the stuck connection may be deleted and/or the software may be notified to trigger a process that will perform housekeeping to clean up the memory resources and the list of active connections.

For illustration purposes, the principles of the present invention are described in the context of an example network device such as an ATM switch or ATM edge device comprising a plurality of ATM ports. Note, however, it is not intended that the invention be limited to the network device described herein. It is appreciated that one skilled in the networking arts may apply the present invention to numerous other types of network devices as well without departing from the spirit and scope of the invention. Note that throughout this document, references are made to AAL5 frames, Ethernet frames and ATM cells which are example protocol data units (PDUs) associated with the AAL5 protocol, Ethernet network and ATM network, respectively. It is appreciated that the invention may be adapted for use in other types of networks that transmit other types of PDUs, e.g., packets.

Figure 2:
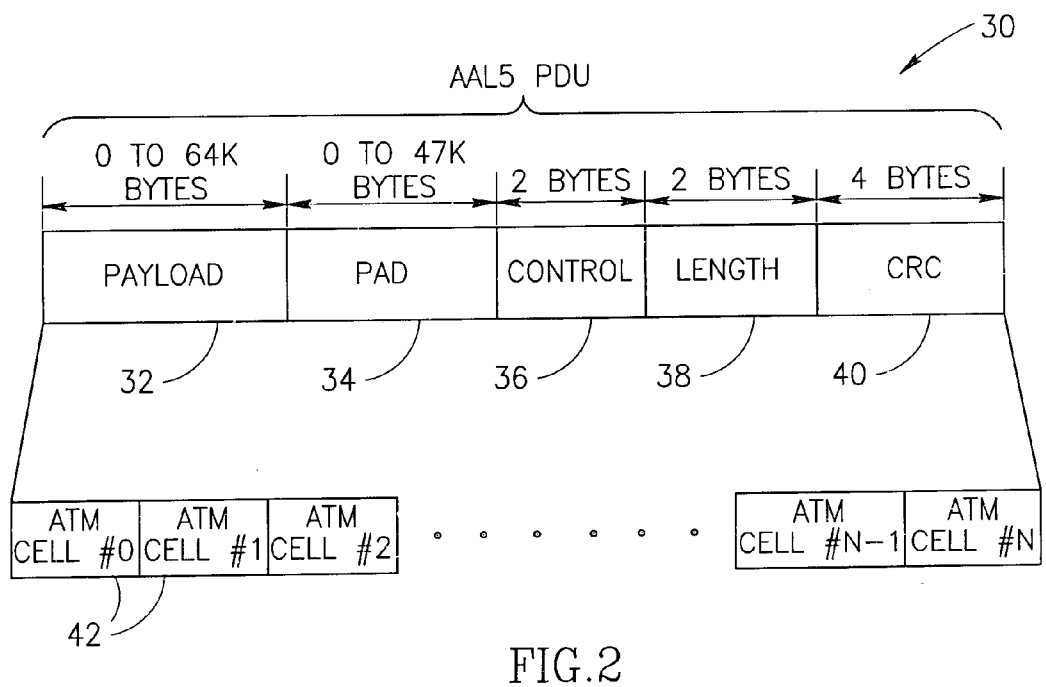
FIG. 2 is a diagram illustrating the format of an AAL5 PDU as transported using a plurality of ATM cells.

A diagram illustrating the format of an AAL5 PDU as transported using a plurality of ATM cells is shown in FIG. 2. The AAL5 Protocol Data Unit (PDU), generally referenced 30, comprises a payload field 32 of 0 to 64 Kbytes, padding field 34 of 0 to 47 bytes, a control field 36 of 2 bytes, a length field 38 of 2 bytes and a Cyclic Redundancy Code (CRC) field 40 of 4 bytes. The length of the payload portion of the AAL5 frame is required to be a multiple of 48 bytes, i.e. N×48 bytes. The padding is used to pad the frame when the length of the payload is not an exact multiple of 48.

The AAL5 protocol is an asynchronous protocol which functions to packetize the data to be transported. It is analogous to the User Datagram Protocol (UDP) protocol widely used over the Internet in that the AAL5 service is an unreliable transport mechanism with no guarantee of receipt of the packet.

In an ATM network, the AAL5 frame is segmented into a plurality of ATM cell before being transported over the ATM network to the destination. Each of the ATM cells 42, labeled ATM cell #0 through cell #N, has the format as shown in FIG. 1. In operation, the AAL5 frame is segmented into 48 byte chunks and encapsulated in ATM cells 42. The last cell may comprise 0 to 40 bytes of padding plus the 8 bytes for the control, length and CRC fields.

Figure 3:
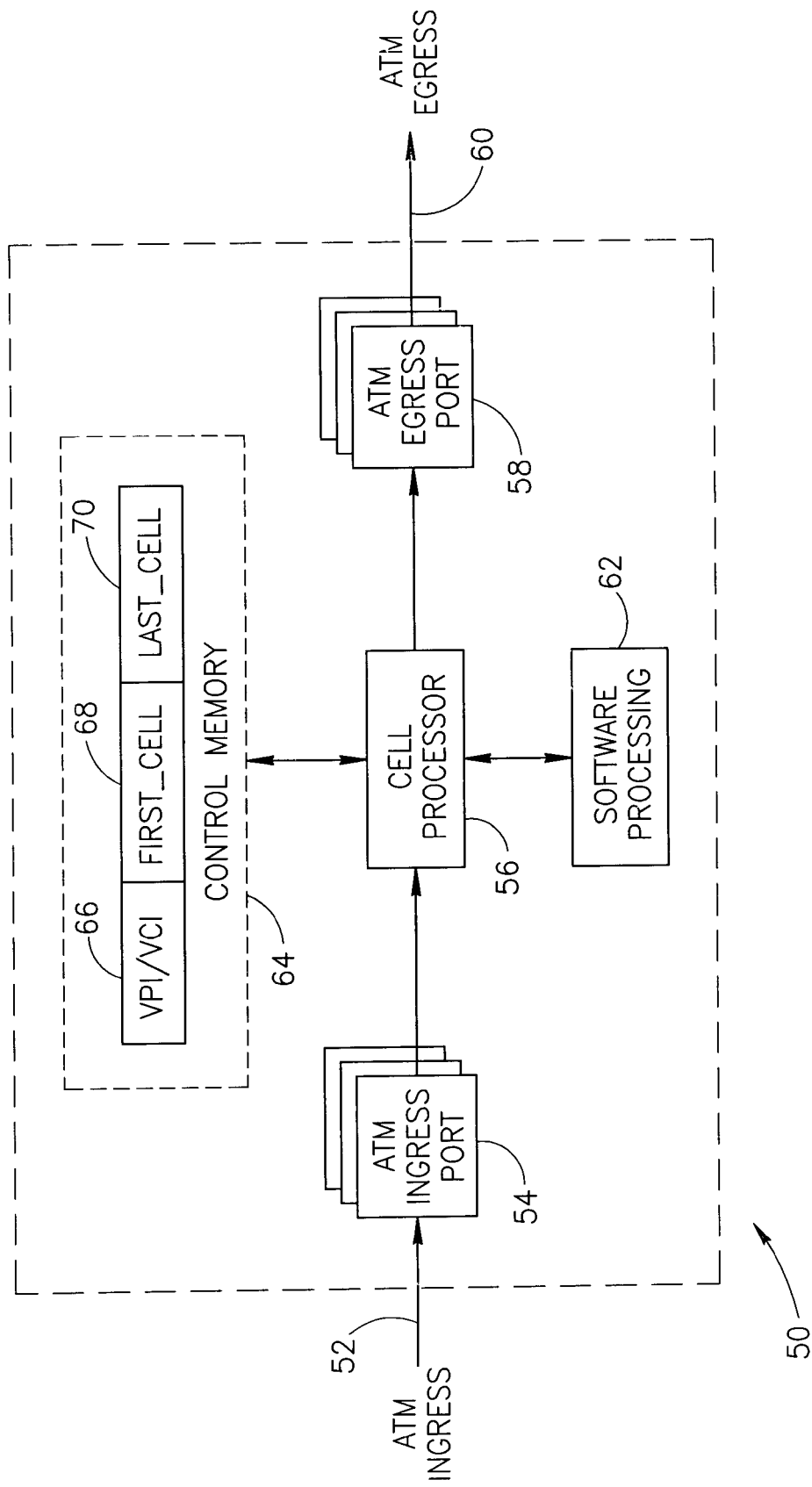
FIG. 3 is a block diagram illustrating the internal processing flow of an ATM network device.

A block diagram illustrating the internal processing flow of an ATM network device is shown in FIG. 3. The example network device, generally referenced 50, may comprise an edge device or switch for use in an ATM network. The device 50 comprises at least one or more ATM ports. In addition, the device may provide standard LAN Emulation services, such as LEC, BUS, LECS, LES, SMS, etc., as defined by ATM Forum LAN Emulation standards. LAN Emulation permits Ethernet traffic to be transported across ATM circuits. For illustration purposes, the Ethernet and ATM ports in the network device have been separated into ingress and egress portions.

In particular, one or more ingress ATM signals 52 are received by ATM ingress ports 52. The ingress ATM ports 54 are connected to an ATM network and adapted to receive ingress ATM cells. The ATM ports may operate at 155 Mbps (OC-3) or 622 Mbps (OC-12), for example. The ingress ports forward the received data to the cell processor 56. The processed cells are forwarded to the appropriate destination egress ports 58 for output as one or more ATM egress signals 60. The output ATM ports 58 are connected to the ATM network and adapted to output egress ATM cells.

Forwarding decisions are made by the cell processor 56 that is configured dynamically by the software processing block 62. Ingress ATM cells are input and processed by the cell processor which functions to generate a forwarding decision. In operation, ATM cells are received and forwarded to the appropriate destination on the ATM network.

The control memory 64 is used by the cell processor in making and processing a forwarding decision. Received cells are temporarily stored in the cell memory pending the determination of a forwarding decision.

The apparatus and method of the present invention is operative to both identify and resolve a stuck VC condition so as to free up memory resources for use by other connections. The invention utilizes two flags per virtual circuit to implement a 'garbage collection' function. In particular, the two flags are used to track certain information about each virtual circuit. One of these flags, i.e. memory bits, is termed the first cell flag and a second flag is termed the last cell flag. In one example embodiment, these flags (or bits) are stored in an incoming VPI/VCI (IVC) table stored in the control memory 64.

Each virtual circuit stored has an associated entry in the IVC table comprising the VPI/VCI pair 66, first_cell flag (or bit) 68 and a last_cell flag (or bit) 70. It is appreciated that the invention is not limited to storing the first cell and last cell flags in an IVC table. The flags may be stored in any suitable storage location or table.

In accordance with the present invention, the last_cell flag is operative to indicate that the last cell (i.e. the latest or most recent) received on a virtual circuit included an end of frame indication. The first_cell flag is operative to indicate each time a first cell of a frame is received. The first_cell flag is preferably set by the hardware and cleared by the software.

In order to be able to release a stuck virtual circuit, it must first be detected. A stuck virtual circuit may be detected by checking that a longer time than reasonable has passed since the first cell of a frame was received on any particular virtual circuit while the most recent cell received on the virtual circuit did not have an end of frame indication. In implementing this, the example embodiment presented herein utilizes both hardware and software.

The hardware is operative to update the first_cell and last_cell bits (i.e. flags) after each cell is received by the ATM device on a per virtual circuit basis. The following rules are performed by the hardware for each cell received:

1. The hardware sets the last_cell bit to '1' for a specific virtual circuit when a cell with an end of frame indication is received on that virtual circuit. Note that, as described above, the end of frame indication can be determined using the 3-bit PTI field in the ATM cell header.
2. The hardware clears the last_cell bit to '0' for a specific virtual circuit when a cell is received without an end of frame indication on that virtual circuit.
3. The hardware sets the first_cell bit to '1' for a specific virtual circuit when the first cell of a frame is received on that virtual circuit. Note that the first_cell bit operates as a 'sticky' bit since the hardware can only set the bit and cannot clear it.
4. Otherwise the hardware does not modify the first_cell bit.

Note that the first_cell is adapted to be set by the hardware and cleared by the software. Preferably, the hardware does not have the ability to clear the first_cell bit.

Figure 4:
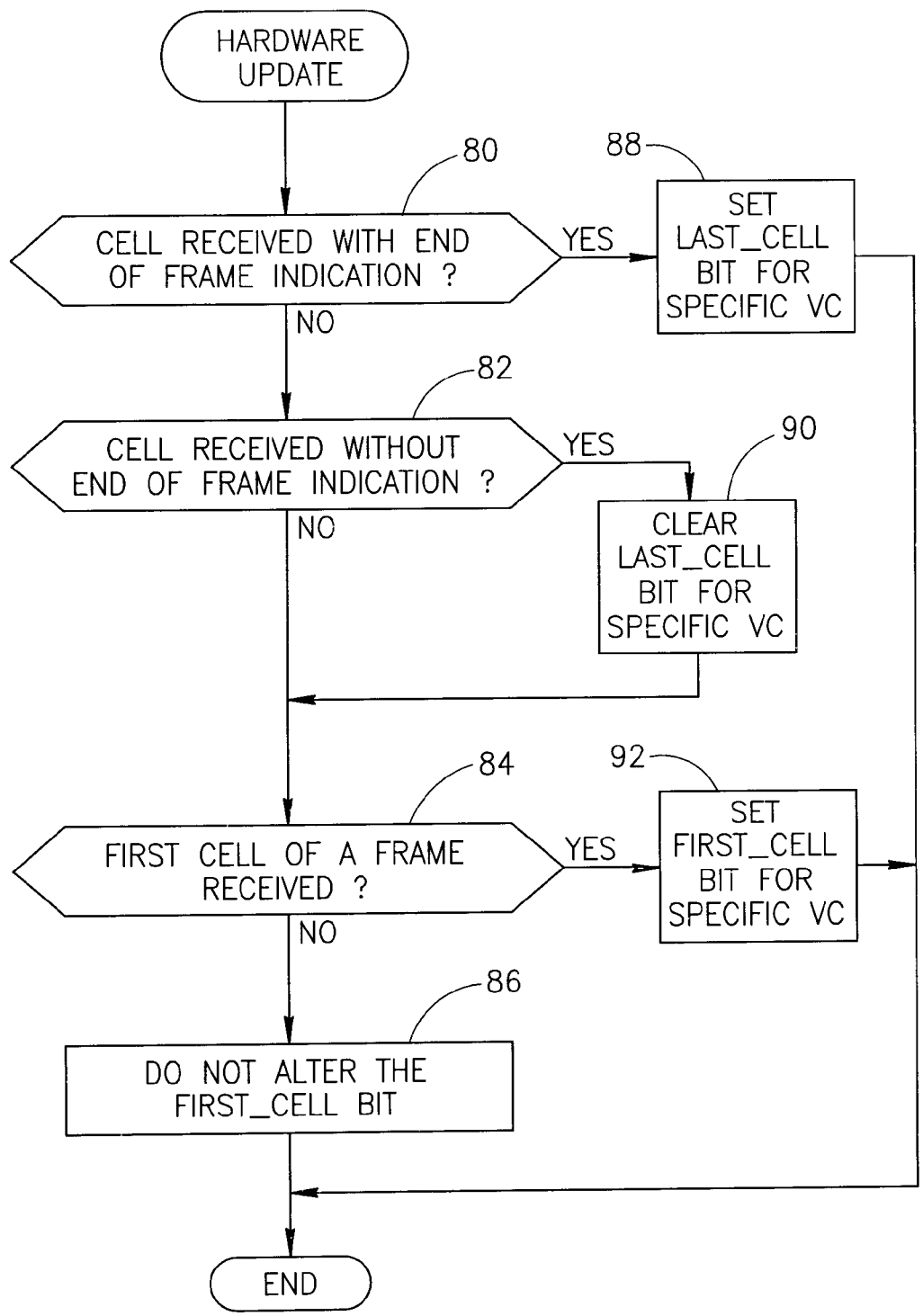
FIG. 4 is a flow diagram illustrating the update functions performed by the hardware in accordance with the present invention.

The above described rules performed by the hardware are also presented in the form of a flow diagram in FIG. 4. The cell received for a specific virtual circuit is first checked for an end of frame indication (step 80). If the cell includes an end of frame indication, the last_cell bit associated with the specific virtual circuit is set (step 88). If the cell is received without an end of frame indication (step 82), the last_cell bit associated with the specific virtual circuit is cleared (step 90).

The cell is then checked if it is a first cell. Note that preferably, the checks on first cell and last cell are performed in parallel. If the first cell of a frame is received (step 84), the first_cell bit associated with the specific virtual circuit is set (step 92). Otherwise, the first_cell bit is not modified (step 86).

The software is operative to perform the following processes. At time of reset, the software initializes the first_cell and last_cell hardware bits associated with each virtual circuit. The first_cell is initialized to '0' and the last_cell is initialized to '1'.

During run time, the software is operative to maintain a list of all the active virtual circuits within the device. It is adapted to scan all the active virtual circuits on the list on a periodic basis. Note that the time between scans may be on the order of a second or more so as to reduce the amount of required computing resources. The software tasks of the present invention may be performed in the background while other tasks are in the idle state.

Note also that the invention including the first_cell and last_cell bit mechanism is particularly suited for use with the transport of Ethernet frames. The maximum length of an Ethernet frame is 1518 bytes of data. Considering a line rate of 10 Mbps, this translates to a frame time of approximately 10 ms.

Thus, when using the invention in an Ethernet environment, a reasonable time between the detection of the first cell of consecutive frames is at least 10 ms. Practically, however, the software process implemented in the network device does not need to perform the method of the invention at such speeds. Depending on the software tasks, the time period between execution of the software routine implementing the method of the invention may be much longer, e.g., one second or longer.

For every virtual circuit scanned, the software is operative to read the two bits (i.e. last_cell and first_cell) updated by the hardware as described hereinabove. The software processes the two bits read in accordance with the following.

first cell='1' (last cell=don't care):

This case signifies that there is no stuck virtual circuit. If the first_cell bit is set to a '1' it means that the hardware detected a first cell of a frame on this particular virtual circuit since the last time the software cleared this bit to '0'. The value of the last_cell bit is a don't care in this case. The software is operative to reset the first_cell bit to '0'.

first cell='0' AND last cell='1':

This case also signifies that there is no stuck virtual circuit. If the first_cell bit is '0' AND the last_cell bit is set to a '1', it means that the hardware did not detect a first cell of a frame on this particular virtual circuit since the last time the software cleared this bit to '0'. The last_cell bit set to '1' indicates the end of frame and therefore this state of the virtual circuit is OK since the entire frame was received. The software does not take any action in this case.

first cell='0' AND last cell='0':

This case signifies that the virtual circuit is stuck. If the first_cell bit is '0' and the last_cell bit is '0', it means that the hardware did not detect a first cell of a frame on this particular virtual circuit since the last time the software cleared this bit to '0'. The last_cell bit set to '0' indicates that a 'stuck' virtual circuit was detected because the end of frame was not received (i.e. the virtual circuit was not closed) for a period exceeding a predetermined threshold, e.g., 100 ms. If the software performs a scan of the active list of virtual circuits once every second or longer, than this threshold will have been exceeded. The software takes action in this case to release the 'stuck' virtual circuit.

Once a stuck virtual circuit is detected, the software may be adapted to perform any suitable action to release it. Two examples of handling the stuck virtual circuit are described hereinbelow. It is appreciated that one skilled in the networking arts may implement other mechanisms of releasing the stuck virtual circuit without departing from the spirit and scope of the present invention.

A first method of releasing the stuck virtual circuit comprises the software generating a single cell upon detecting a stuck virtual circuit. The single cell is generated so as to comprise an end of frame indication. The cell is processed as if it was received over the ATM network on the problematic virtual circuit.

In particular, the AAL5 CRC field in the cell should be set so that the frame causes an error. The cell will cause the frame to be closed on this particular virtual circuit and, since the frame is an error frame, the frame will be discarded. Consequently, all the memory resources occupied (i.e. consumed) by the frame will be released.

Note that the cell generated is made to cause an error on the frame in order that the frame data previously received and stored in memory will not be used. Since the last cell was lost, it is desirable to discard the frame data already received.

A second method of releasing the stuck virtual circuit comprises the software writing to a hardware register dedicated for the purpose of releasing the stuck virtual circuit. The software is adapted to write the VPI and VCI identifying the stuck virtual circuit to this dedicated register. In response, the hardware restores the state of the virtual circuit back to normal operating state. The hardware comprises the appropriate circuitry and logic to emulate the events that would occur if it had received a cell having an end of frame indication and an erroneous AAL5 CRC check. This causes the hardware to restore the virtual circuit to the normal state and consequently to release all the memory resources previously consumed by the frame.

Note that the above assumes that the device is adapted to comprise hardware that is operative to cleat the memory resources when the last cell for a frame transmitted over a virtual circuit arrives at the network device.

Figure 5:
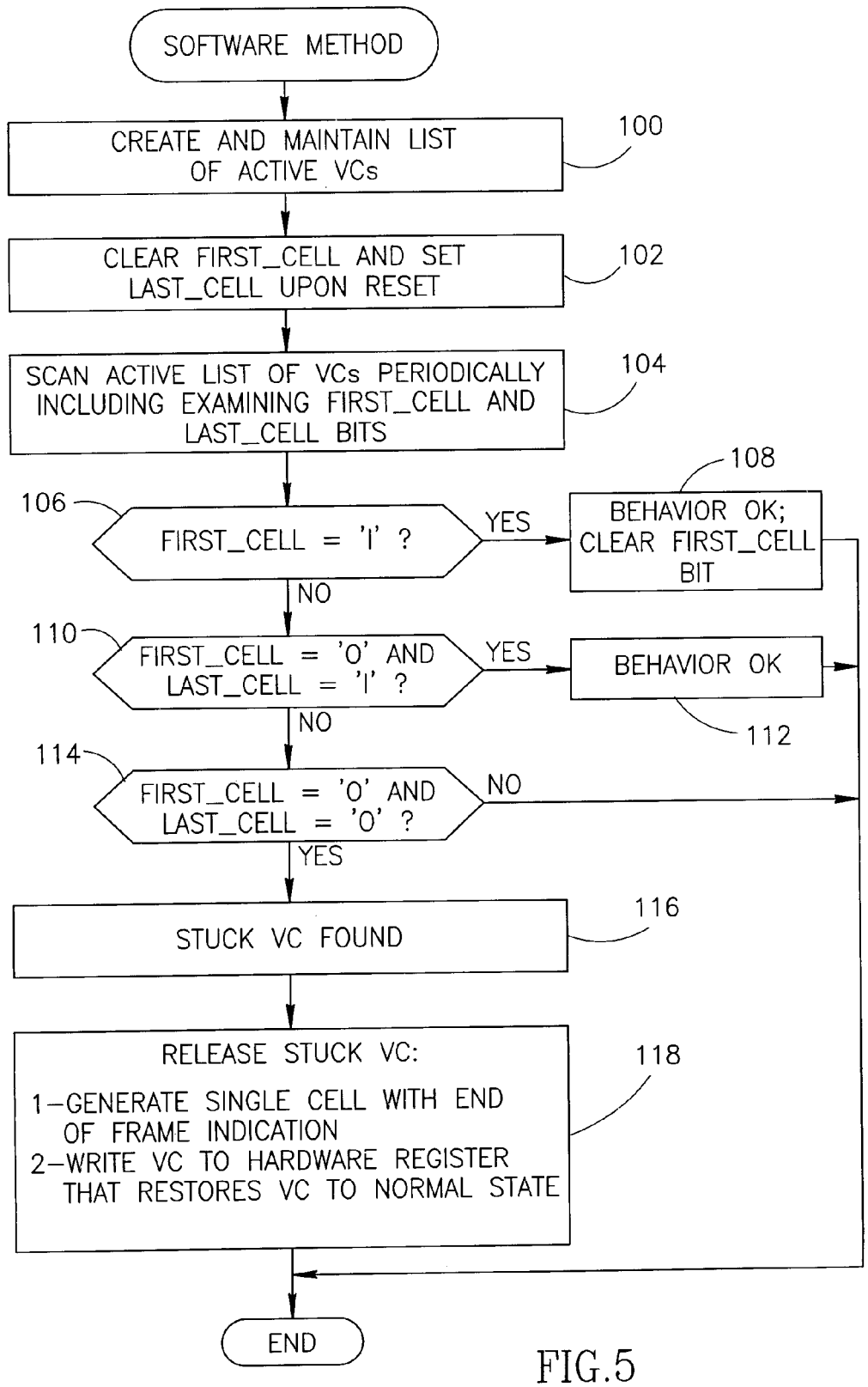
FIG. 5 is a flow diagram illustrating the stuck virtual circuit release method performed by the software in accordance with the present invention.

The above described stuck virtual circuit release method performed by the software is also presented in the form of a flow diagram in FIG. 5. Initially, after reset, the software creates and maintains a list of all active virtual circuits (step 100). Upon reset, the software clears the first_cell bit and sets the last_cell bit to one (step 102). Then, on a periodic basis such as during the time the processor is idle, the software scans the active list of virtual circuits including the first_cell and last_cell bits (step 104). The bits may be scanned on an irregular basis such as when the processor performs general housekeeping tasks.

If the first_cell equals '1' (step 106), while the last_cell is a don't care, then the virtual circuit is declared OK and the first_cell bit is cleared by the software (step 108). If the first_cell is equal to '0' and the last_cell is equal to '1' (step 110) then the behavior is deemed to be OK (step 112).

If the first_cell is equal to '0' and the last_cell is equal to '0' (step 114) then a stuck virtual circuit has been found (step 116). As described above, the stuck virtual circuit can be released in any suitable manner, for example, by generating a signal cell with an end of frame indication or by writing the virtual circuit related information (i.e. VPI and VCI) to a dedicated hardware register that functions to restore the virtual circuit the normal state (step 118).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein.

Accordingly, it will be appreciated that all suitable variations, modifications and equivalents may be resorted to, falling within the spirit and scope of the present invention.

What is claimed is:

1. A method of releasing a stuck virtual circuit, wherein the last cell of a frame transmitted on said virtual circuit is not received, said method comprising the steps of:

setting a first_cell flag upon reception of the first cell of a frame on said virtual circuit;

setting a last_cell flag upon reception of a cell on said virtual circuit having an end of frame indication;

clearing said last_cell flag upon reception of a cell on said virtual circuit not having an end of frame indication;

examining said first_cell flag and said last_cell flag periodically; and if said first_cell flag is set, clearing said first_cell flag; and if, after a predetermined period of time, said first_cell flag is cleared and said last_cell flag is cleared then identifying said virtual circuit as a stuck virtual circuit; and releasing memory resources currently consumed by said stuck virtual circuit.

2. The method according to claim 1, further comprising the step of generating a single cell with an end of frame indication wherein said cell is adapted to cause the frame to be received in error such that the frame is subsequently closed and discarded thereby releasing resources consumed by said frame.

3. The method according to claim 2, wherein said single cell is generated so as to cause a Cyclic Redundancy Code (CRC) check error.

4. The method according to claim 1, further comprising the step of providing a means of emulating the action that would normally by taken upon receiving a cell adapted to cause an error and having an end of frame indication such that said stuck virtual circuit is restored to normal operating status.

5. The method according to claim 4, wherein said cell is adapted to cause a Cyclic Redundancy Code (CRC) check error.

6. The method according to claim 1, wherein said first_cell flag comprises a single bit.

7. The method according to claim 1, wherein said last_cell flag comprises a single bit.

8. The method according to claim 1, further comprising the step of maintaining a list of all active virtual circuits and periodically scanning the first_cell flag and the last_cell flag associated only with virtual circuits on said active list.

9. The method according to claim 1, wherein said predetermined period of time is at least as long as the longest expected frame duration time.

10. The method according to claim 1, wherein said predetermined period of time is greater than or equal to a half second.

11. The method according to claim 1, wherein said first_cell flag comprises a sticky bit whereby said bit is set using hardware means and cleared only using software means.

12. The method according to claim 1, further comprising the step of identifying said virtual circuit in a normal state when said first_cell flag is set.

13. The method according to claim 1, further comprising the step of identifying said virtual circuit in a normal state when said first_cell flag is cleared and said last_cell flag is set.

14. A method of releasing a stuck virtual circuit, wherein the last cell of a frame transmitted on said virtual circuit is not received, said method comprising the steps of:

setting a first_cell bit upon reception of the first cell of a frame on said virtual circuit;

setting a last_cell bit upon reception of a cell on said virtual circuit having an end of frame indication;

clearing said last_cell bit upon reception of a cell on said virtual circuit not having an end of frame indication;

examining on a periodic basis said first_cell bit and said last_cell bit; and if said first_cell bit is set, clearing said first_cell bit;

identifying said virtual circuit as a stuck virtual circuit when a first cell has not been received since said first_cell bit was cleared and said last_cell bit is cleared; and releasing memory resources currently consumed by said stuck virtual circuit.

15. The method according to claim 14, further comprising the step of generating a single cell with an end of frame indication wherein said cell is adapted to cause the frame to be received in error such that the frame is subsequently closed and discarded thereby releasing resources consumed by said frame.

16. The method according to claim 14, further comprising the step of providing a means of emulating the action that would normally by taken upon receiving a cell adapted to cause an error and having an end of frame indication such that said stuck virtual circuit is restored to normal operating status.

17. The method according to claim 14, wherein said first_cell bit functions as a sticky bit whereby said sticky bit is set using hardware means and cleared only using software means.

18. The method according to claim 14, further comprising the step of identifying said virtual circuit in a normal state when said first_cell bit is set.

19. The method according to claim 14, further comprising the step of identifying said virtual circuit in a normal state when said first_cell bit is cleared and said last_cell bit is set.

20. An apparatus for releasing a stuck virtual circuit, wherein the last cell of a frame transmitted on said virtual circuit is not received, comprising:

a control memory adapted to store, for each virtual circuit, a first_cell bit and a last_cell bit;

a cell processor operative to:
set a first_cell bit upon reception of the first cell of a frame on said virtual circuit;
set a last_cell bit upon reception of a cell on said virtual circuit having an end of frame indication;
clear said last_cell bit upon reception of a cell on said virtual circuit not having an end of frame indication;

software means operative on said cell processor to:
examining said first_cell bit and said last_cell bit periodically; and if said first_cell bit is set,
clearing said first_cell bit; and if, after a predetermined period of time, said first_cell bit is cleared and said last_cell bit is cleared then
identifying said virtual circuit as a stuck virtual circuit; and means for releasing memory resources currently consumed by said stuck virtual circuit.

21. The apparatus according to claim 20, further comprising means for generating a single cell with an end of frame indication wherein said cell is adapted to cause the frame to be received in error such that the frame is subsequently closed and discarded thereby releasing resources consumed by said frame.

22. The apparatus according to claim 20, further comprising means for emulating the action that would normally by taken upon receiving a cell adapted to cause an error and having an end of frame indication such that said stuck virtual circuit is restored to normal operating status.

23. The apparatus according to claim 20, wherein said first_cell bit functions as a sticky bit whereby said sticky bit is set by said cell processor using hardware means and cleared only by said software means.

24. The apparatus according to claim 20, further comprising means for identifying said virtual circuit in a normal state when said first_cell bit is set.

25. The apparatus according to claim 20, further comprising means for identifying said virtual circuit in a normal state when said first_cell bit is cleared and said last_cell bit is set.

* * * * *